(12) United States Patent
Yasunari et al.

(10) Patent No.: US 6,697,430 B1
(45) Date of Patent: Feb. 24, 2004

(54) MPEG ENCODER

(75) Inventors: Tomoko Yasunari, Osaka (JP); Hideki Fukuda, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/572,731

(22) Filed: May 17, 2000

(30) Foreign Application Priority Data

May 19, 1999 (JP) ............................................ 11-138186

(51) Int. Cl.⁷ ................................................ H04B 1/66
(52) U.S. Cl. ............................ 375/240.13; 375/240.16; 375/240.15; 375/240.12; 382/236; 382/238; 382/248; 382/250; 348/699; 348/412
(58) Field of Search ............................ 375/240.13, 240, 375/240.16, 240.15, 240.12, 240.2, 240.18; 348/699, 412, 415; 382/236, 238, 248, 250, 246

(56) References Cited

U.S. PATENT DOCUMENTS

| | | | | |
|---|---|---|---|---|
| 5,268,755 A | * | 12/1993 | Nishino et al. ............. | 606/108 |
| 5,510,839 A | * | 4/1996 | Hamano et al. ......... | 375/240.16 |
| 5,657,086 A | * | 8/1997 | Tahara et al. .......... | 375/240.13 |
| 5,856,848 A | * | 1/1999 | Fujiwara et al. ....... | 375/240.13 |

FOREIGN PATENT DOCUMENTS

| JP | 7-131793 | 5/1995 |
|---|---|---|
| JP | 10-191324 | 7/1998 |

* cited by examiner

*Primary Examiner*—Shawn S. An
(74) *Attorney, Agent, or Firm*—Nixon Peabody, LLP

(57) ABSTRACT

A coding information memory is provided for storing coding modes that have been applied to respective compressed blocks. When a current block to be coded is input, coding distortion is estimated for respective candidate blocks corresponding to multiple coding modes. At the same time, by reference to the coding information memory, the frequencies of coding modes that have been applied to a plurality of blocks, which include a block contained in a compressed frame and located at the same position as the current block, are counted. Then, the coding mode for the current block is determined by weighting the estimated coding distortion such that the weighted distortion is inversely proportional to the counted frequencies and that one of the candidate blocks with the smallest weighted coding distortion is selected.

3 Claims, 3 Drawing Sheets

Fig. 2 order of presentation ··· B0 B1 I2 B3 B4 P5 B6 B7 P8 ··· order of encoding ··· I2 B0 B1 P5 B3 B4 P8 B6 B7 ···

⟶ time

Fig. 3 current frame

| M11 | M12 | M13 | M14 | M15 | M16 |
|-----|-----|-----|-----|-----|-----|
| M21 | M22 | M23 | M24 | M25 | M26 |
| M31 | M32 | M33 | M34 | M35 | M36 |
| M41 | M42 | M43 | M44 | M45 | M46 |

Fig. 4 previous frame or reference frame

| R11 | R12 | R13 | R14 | R15 | R16 |
|-----|-----|-----|-----|-----|-----|
| R21 | R22 | R23 | R24 | R25 | R26 |
| R31 | R32 | R33 | R34 | R35 | R36 |
| R41 | R42 | R43 | R44 | R45 | R46 |

MPEG ENCODER

BACKGROUND OF THE INVENTION

The present invention relates to an MPEG encoder for compressing a moving picture.

MPEG standards are known as international video compression standards issued by Moving Picture Experts Group. In accordance with these standards, each of the frames representing a moving picture is classified as an I, P or B frame. An I-frame stands for an intra-coded frame, which is also called an "intra frame". A P-frame is an abbreviation of a predictively coded frame, which is also called a "predicted frame". And a B-frame means a bidirectionally coded frame, which is also called a "bidirectionally predicted frame". The mode of coding applicable to a picture, or the type of macroblocks included in the picture, is determined depending on the type of the picture, i.e., I, P or B. Specifically, macroblocks in an I-frame are processed in an intra-frame coding mode. Macroblocks in a P-frame are coded in an intra-frame coding mode or in a forward inter-frame predictive coding mode with or without motion compensation. One of these coding modes is selected for the P-frame to minimize a prediction error. And macroblocks in a B-frame are coded in an intra-frame coding mode or in a forward, backward or bidirectional inter-frame predictive coding mode. As for the B-frame, one of these coding modes is also selected to minimize a prediction error. It should be noted that the predictive coding modes for B-frames all require motion compensation. Each macroblock is composed of 16×16 pixels.

According to the conventional video compression technique, a coding mode is selected for each macroblock without taking the coding modes of other macroblocks into account. Thus, even a pair of closely correlated macroblocks (which may belong to either two different frames or a single frame) may be coded in mutually different modes due to noise superimposed on a frame, for example. This is one of the factors that might deteriorate the quality of image data when a compressed version of the data is decoded.

SUMMARY OF THE INVENTION

It is therefore an object of the present invention to avoid such deterioration in image quality by modifying an algorithm for determining a coding mode.

To achieve this object, the present invention determines the coding mode for each block in a current frame in conjunction with either the coding mode(s) of at least one block in another frame compressed or the coding mode(s) of at least one other block in the current frame. In this manner, the same coding mode will be applied to two closely correlated blocks.

BRIEF DESCRIPTION OF THE DRAWINGS

FIG. 2 illustrates an exemplary sequence of frames that make up a moving picture.

FIG. 3 illustrates an arrangement of blocks in a current frame.

FIG. 4 illustrates an arrangement of blocks in a previous frame, which has been compressed just before the current frame, or in a reference frame.

DETAILED DESCRIPTION OF THE INVENTION

Figure 1:
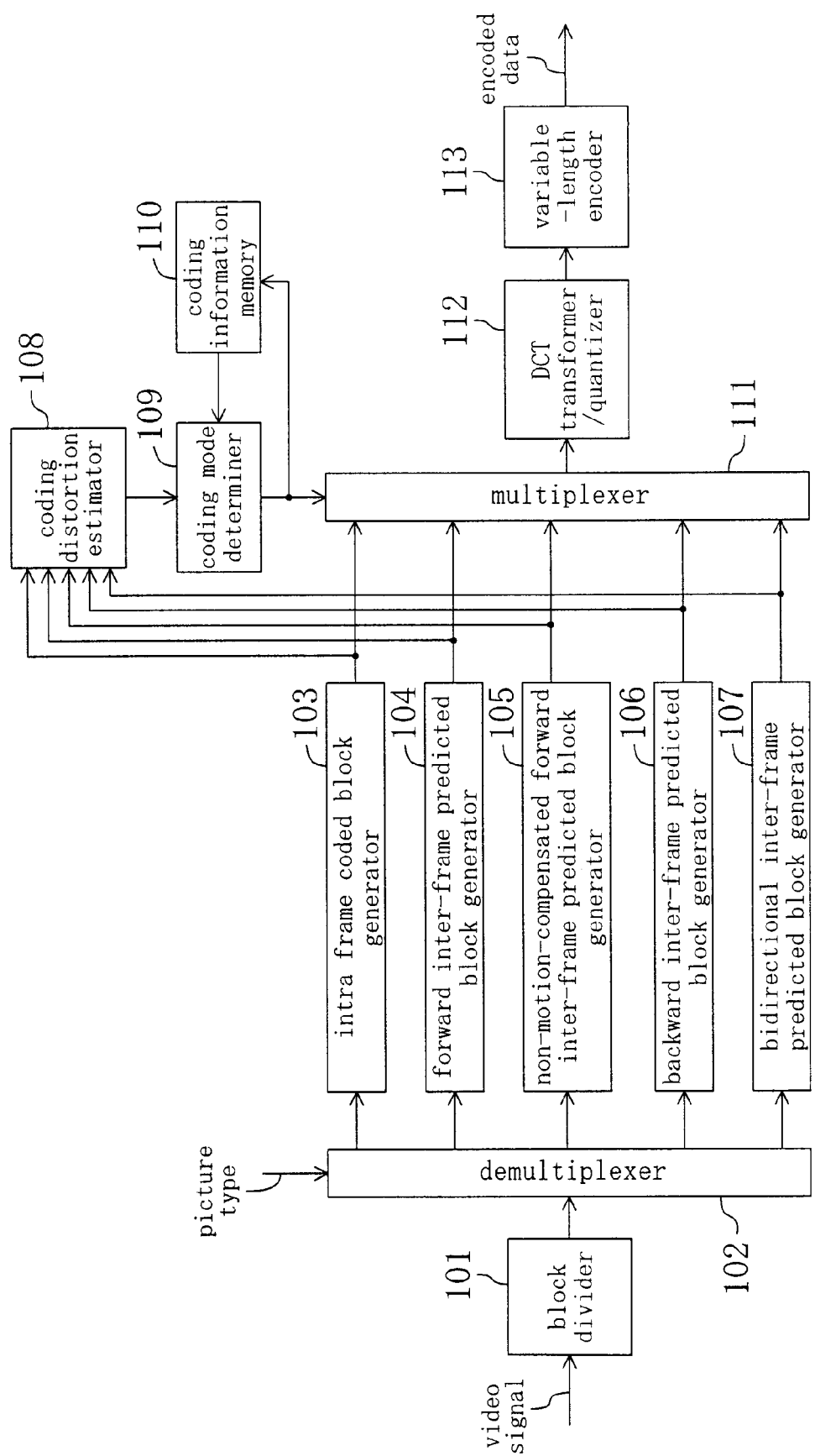
FIG. 1 is a block diagram illustrating an exemplary configuration for an inventive MPEG encoder.

FIG. 1 illustrates an exemplary configuration for an inventive MPEG encoder. The MPEG encoder shown in FIG. 1 is used for compressing and coding a moving picture on a block-by-block basis. As used herein, the "block-by-block" basis means that coding is carried out on the basis of a macroblock composed of 16×16 pixels. The MPEG encoder includes block divider 101, demultiplexer 102, intra-frame coded block generator 103, forward inter-frame predicted block generator 104, non-motion-compensated forward inter-frame predicted block generator 105, backward inter-frame predicted block generator 106, bidirectional inter-frame predicted block generator 107, coding distortion estimator 108, coding mode determiner 109, coding information memory 110, multiplexer 111, discrete cosine transformer/quantizer (which will be abbreviated as "DCT transformer/quantizer") 112 and variable length encoder 113. A digital video signal representing a moving picture is input to the MPEG encoder shown in FIG. 1, which outputs compressed image data. The coding information memory 110 stores coding modes, which have been applied to respective compressed blocks, as coding history.

When respective frames, which together represent the moving picture, are input as frames to be coded to the MPEG encoder shown in FIG. 1, the block divider 101 divides each of these frames into a plurality of blocks and then provides each of these blocks as a block to be coded. In this specification, a frame and a block to be coded or being processed will sometimes be called "current frame" and "current block", respectively. The demultiplexer 102 selects at least one of the intra-frame coded block generator 103 and the inter-frame predicted block generators 104 through 107, which is associated with a coding mode applicable to the current block, as candidate block generator depending on the picture type of the current frame. Then, the demultiplexer 102 makes the candidate block generator process the current block. More specifically, only the intra-frame coded block generator 103 is selected for an I-frame. The intra-frame coded block generator 103, forward inter-frame predicted block generator 104 and non-motion-compensated forward inter-frame predicted block generator 105 are selected for a P-frame. And the intra-frame coded block generator 103 and forward, backward and bidirectional inter-frame predicted block generators 104, 106 and 107 are selected for a B-frame. Although not illustrated, each of these inter-frame predicted block generators 104 through 107 generates inter-frame predicted blocks from a current block by using one or two reference frames obtained by subjecting the output of the DCT transformer/quantizer 112 to inverse quantization and inverse DCT.

The coding distortion estimator 108 estimates the coding distortion of each of one or more candidate blocks obtained by the candidate block generator(s). For example, a variance of pixels that make up each candidate block is obtained and output as coding distortion. If the candidate block is an inter-frame predicted block, then the absolute sum, squared sum or mean squared error of component pixels in the block may be obtained as a prediction error, or the coding distortion. The coding mode determiner 109 determines a coding mode that should be applied to the current block by the coding distortion estimated and the coding history stored on the coding information memory 110. The coding information memory 110 stores the coding modes of respective blocks that have been determined by the coding mode determiner 109 as coding history for one group of pictures (GOP) or a single scene. The multiplexer 111 selects one of the candidate blocks that corresponds to the coding mode determined. The DCT transformer/quantizer 112 and the variable length encoder 113 generate compressed image data from the candidate block selected.

The coding mode determiner 109 may use the coding history in at least one of the following three manners either by itself or in combination:

(1) First, by reference to the coding history, the frequencies of coding modes that have been applied to multiple blocks, which include a block that is contained in one of the compressed frames (e.g., a previous frame that has been compressed just before the current frame or a reference frame) and located at the same position as the current block, are counted. And the coding mode that should be applied to the current block may be determined by the coding distortion estimated and the frequencies counted. More specifically, the coding mode for the current block is determined by weighting the estimated coding distortion such that the weighted coding distortion is inversely proportional to the counted frequencies and that one of the candidate blocks that has the smallest weighted coding distortion is selected by the multiplexer 111.

(2) If the current frame is a B-frame, then the coding mode for the current block may be determined by the coding history and estimated coding distortion of one or more blocks, which include a block that is contained in a P-frame to be referenced by the B-frame and that is located at the same position as the current block.

(3) The coding mode for the current block may also be determined by the coding history of at least one other compressed block within the current frame and the estimated coding distortion.

Hereinafter, it will be described by way of a specific example illustrated in FIGS. 2 through 4 how the coding mode determiner 109 uses the coding history.

FIG. 2 illustrates an exemplary sequence of frames that make up a moving picture. In FIG. 2, the numerals 0 through 8 indicate the order of frames to be presented. However, the frames are compressed in a different order. For example, frames B3 and B4 are compressed after frames I2 and P5, which should be forward and backward reference frames, have both been compressed. It should be noted that a B-frame is not used as a reference frame for inter-frame predictive coding.

FIG. 3 illustrates an exemplary arrangement of blocks in a current frame. In FIG. 3, respective blocks in the frame are identified by M11 through M46. In the illustrated example, M11 through M22 are compressed blocks, M23 is the current block being coded and M22 is a block adjacent to the block M23.

FIG. 4 illustrates an arrangement of blocks in a previous frame that has been compressed just before the current frame or in a reference frame. In FIG. 4, R11 through R46 represent respective blocks in a reference frame, for example, and R23 is a block located at the same position as the current block M23 shown in FIG. 3. Also, in FIG. 4, the block R23 and its surrounding eight blocks are highlighted by hatching.

At a point in time that the frame B4 shown in FIG. 2 is input as a current frame to the block divider 101, the frames I2, B0, B1, P5 and B3 shown in FIG. 2 have all been compressed. And the history representing the coding modes that have been applied to these frames is stored block-by-block on the coding information memory 110. In the illustrated example, a block located at a position identified by M23 in FIG. 3 has just been provided as a current block from the block divider 101. The demultiplexer 102 makes each of the intra-frame coded block generator 103 and forward, backward and bidirectional inter-frame predicted block generators 104, 106 and 107 generate a candidate block associated with the current block M23 in the frame B4. Then, the coding distortion estimator 108 estimates the coding distortion of the four candidate blocks that have been generated by these block generators 103, 104, 106 and 107. By reference to the coding information memory 110, the coding mode determiner 109 counts the frequencies of coding modes that have been applied to the nine blocks including the block R23 located at the same position as the current block M23 (see FIG. 4) and contained in the compressed frame P5. Then, the coding mode determiner 109 determines a coding mode for the current block M23 by weighting the coding distortion such that the weighted coding distortion is inversely proportional to the counted frequencies and that one of the candidate blocks that has the smallest weighted coding distortion is selected by the multiplexer 111. As a result, the coding mode for the current block M23 in the frame B4 has been determined in conjunction with the coding modes for the frame P5. If the non-motion-compensated forward inter-frame predictive coding mode is prevalent in the frame P5, then the motion vector is preferably set to zero no matter which of the forward, backward and bidirectional inter-frame predictive coding modes is selected for the current block M23.

Note that the frequencies of coding modes applied may be counted for any arbitrary number of blocks or frames. In this case, each of the frames but the current one is preferably weighted differently in view of a time lag between the current frame and the frame in question.

Also, the coding mode for the current block M23 may also be determined by the coding history of at least one compressed block (e.g., the block M22 shown in FIG. 3) in the current frame and its coding distortion estimated by the coding distortion estimator 108.

As for a B-frame, in particular, a coding mode that uses only one of the two reference frames, which is closer to the current frame than the other reference frame according to the order of presentation, may be selected. In the example illustrated in FIG. 2, while the frame B4 is being compressed, a backward inter-frame predictive coding mode using only the frame P5 may be selected. On the other hand, while the frame B3 is being compressed, a forward inter-frame predictive coding mode using only the frame I2 may be selected.

Figure 5:
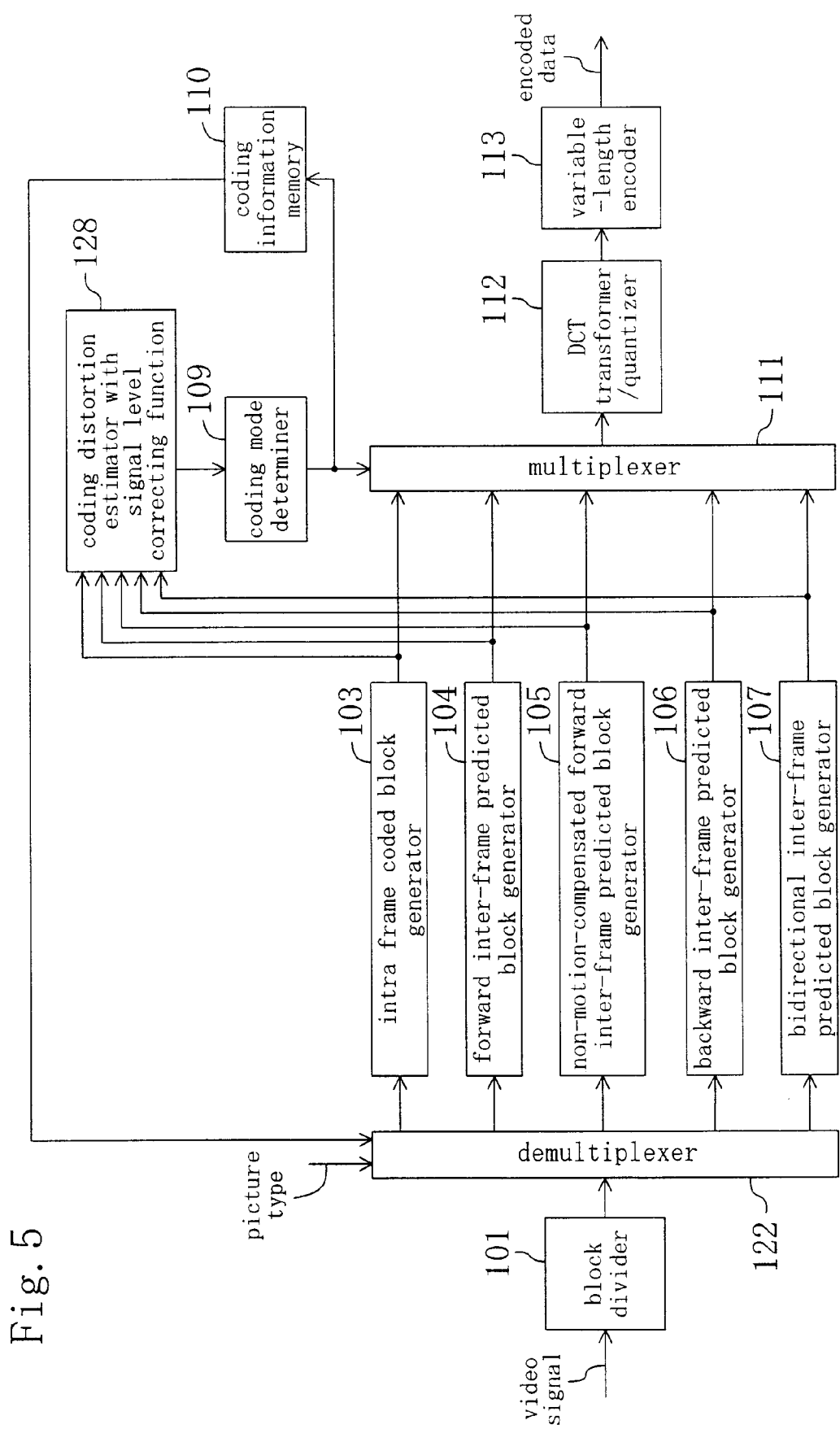
FIG. 5 is a block diagram illustrating another exemplary configuration for the inventive MPEG encoder.

FIG. 5 illustrates another exemplary configuration for the inventive MPEG encoder. In the MPEG encoder shown in FIG. 5, a demultiplexer 122 references the coding history stored on the coding information memory 110 unlike the encoder shown in FIG. 1. In addition, the coding distortion estimator 108 shown in FIG. 1 is replaced with a coding distortion estimator 128 with signal level correcting function. In the other respects, the encoder shown in FIG. 5 is the same as the counterpart shown in FIG. 1.

The demultiplexer 122 selects at least one of the intra-frame coded block generator 103 and the inter-frame predicted block generators 104 through 107, which is associated with a coding mode applicable to the current block, as candidate block generator(s) depending on the picture type of the current frame and the coding history. Then, the demultiplexer 122 makes the candidate block generator(s) process the current block. More specifically, only the intra-frame coded block generator 103 is selected for an I-frame. The intra-frame coded block generator 103, forward inter-frame predicted block generator 104 and non-motion-compensated forward inter-frame predicted block generator 105 are selected for a P-frame. As for a B-frame, not only the intra-frame coded block generator 103 but also appropriate one of the forward, backward and bidirectional inter-frame predicted block generators 104, 106 and 107 are selected considering the coding history. Also, as for a B-frame, the demultiplexer 122 counts the frequencies of coding modes that have been applied to all the blocks in a previous frame that has been compressed just before the B-frame or in one or two reference frames. And the demultiplexer 122 preferentially selects one inter-frame predicted block generator 104, 106 or 107 corresponding to a coding mode that has been applied most frequently. The coding distortion estimator 128 with signal level correcting function removes DC components from at least one candidate block(s) obtained by the candidate block generator(s) and then estimates the coding distortion of the block(s). The coding mode determiner 109 determines the coding mode for the current block such that a candidate block with the smallest coding distortion estimated is selected by the multiplexer 111.

Since the coding distortion estimator 128 removes the DC components, an appropriate coding mode can be selected without being affected by variation of the DC components even in compressing a moving picture with fade-in or fade-out effects. It should be noted that the DC components should be removed if a P-frame is to be coded, but need not be removed as for a B-frame. This is because as for a B-frame, only one of the forward, backward and bidirectional inter-frame predicted block generators 104, 106 and 107 is selected by the demultiplexer 122 in accordance with the coding history.

In the MPEG encoder shown in FIG. 5, if a P-frame, which can be a reference frame, is to be coded, then multiple inter-frame predicted block generators 104 and 105 are selected by the demultiplexer 122 as in the prior art such that compression of succeeding frames is not affected. However, if a B-frame, which cannot be a reference frame, is to be coded, then only one of the inter-frame predicted block generators 104, 106 and 107 is selected by the demultiplexer 122 in accordance with the coding history. Thus, the coding modes of respective blocks in the B-frame are determined in conjunction with the coding modes of one or more blocks in another compressed frame.

If the current frame is included in a scene with almost no motion, then only one of the inter-frame predicted block generators 104 through 107 may be selected by the demultiplexer 122 in accordance with the coding history stored on the coding information memory 110, no matter whether the current frame is P-frame or B-frame.

What is claimed is:

1. An MPEG encoder for compressing a moving picture on a block-by-block basis in a frame, the encoder comprising:

means for storing coding modes, which have been applied to respective compressed blocks of the moving picture, as coding history;

means for inputting respective frames, which together represent the moving picture, as frames to be coded;

means for dividing each said frame into a plurality of blocks and providing each of the blocks as a current block;

an intra-frame coded block generator for performing processing in an intra-frame coding mode;

a plurality of inter-frame predicted block generators for performing processing in multiple inter-frame predictive coding modes;

means for selecting at least one of the intra-frame coded block generator and the inter-frame predicted block generators, which is associated with a coding mode applicable to the current block, as candidate block generator(s) depending on a picture type of each said frame to be coded and for making the candidate block generator(s) process the current block;

means for estimating coding distortion for each of one or more candidate blocks obtained by the candidate block generator(s);

means for counting frequencies of coding modes that have been applied to multiple blocks, which include a block that is contained in one of the compressed frames and located at the same position as the current block, by reference to the coding history;

means for determining a coding mode for the current block by the coding distortion estimated and the frequencies counted and for selecting one of the candidate blocks that corresponds to the coding mode determined; and means for generating compressed image data from the selected candidate block wherein the coding mode for the current block is determined by weighting the estimated coding distortion such that the weighted coding distortion is inversely proportional to the counted frequencies and that one of the candidate blocks that has the smallest weighted coding distortion is selected.

2. The MPEG encoder of claims 1 further comprising:

means for determining a coding mode for the current block by the coding distortion estimated and the coding history and for selecting one of the candidate blocks that corresponds to the coding mode determined;

wherein if the frame to be coded is a bidirectionally predicted frame (B-frame), then the coding mode for the current block is determined by the coding history of one or more blocks, which include a block that is contained in a predicted frame (P-frame) to be referenced by the B-frame and that is located at the same position as the current block.

3. The MPEG encoder of claim 1 further comprising:

means for determining a coding mode for the current block by the coding distortion estimated and the coding history of at least one compressed block in the frame to be coded and for selecting one of the candidate blocks that corresponds to the coding mode determined.

* * * * *